United States Patent
Ugarov

(10) Patent No.: US 12,235,239 B2
(45) Date of Patent: Feb. 25, 2025

(54) ION MOBILITY ENHANCED QUALITATIVE AND QUANTITATIVE METHODS

(71) Applicant: THERMO FINNIGAN LLC, San Jose, CA (US)

(72) Inventor: Mikhail V. Ugarov, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 43 days.

(21) Appl. No.: 17/714,029

(22) Filed: Apr. 5, 2022

(65) Prior Publication Data

US 2023/0314372 A1    Oct. 5, 2023

(51) Int. Cl.
*G01N 27/623*    (2021.01)

(52) U.S. Cl.
CPC .................................. *G01N 27/623* (2021.01)

(58) Field of Classification Search
CPC ....................................................... G01N 27/623
USPC ......................................... 324/459, 464, 468
See application file for complete search history.

(56) References Cited

U.S. PATENT DOCUMENTS

| | | | |
|---|---|---|---|
| 9,812,310 B2 | 11/2017 | Kovtoun et al. | |
| 10,060,789 B2 | 8/2018 | Silveira | |
| 10,663,428 B2 | 5/2020 | Ugarov | |
| 10,825,677 B2 | 11/2020 | Green et al. | |
| 2011/0183431 A1 | 7/2011 | Covey | |
| 2019/0355568 A1* | 11/2019 | Papanastasiou | H01J 49/36 |
| 2020/0006043 A1 | 1/2020 | Ugarov | |
| 2021/0183639 A1* | 6/2021 | Remes | H01J 49/427 |
| 2022/0216046 A1 | 7/2022 | Cooks | |

OTHER PUBLICATIONS

Li et al. "Ion Trap Array Mass Analyzer: Structure and Performance" Analytical Chemistry, 2009, vol. 18, No. 12, pp. 4840-4846.
Meier et al. "Parallel Accumulation—Serial Fragmentation (PAFSEF): Multiplying Sequencing Speed and Sensitivity by Synchomized Scans in a Trapped Ion Mobility Device" Journal of Proteome Research, Nov. 5, 2015, vol. 14, No. 12, pp. 5378-5387.
Willems et al. "AlphaTims: Indexing Trapped Ion Mobility Spectrometry—TOF Data for Fast and Easy Accession and Visualization" Molecular & Cellular Proteomics, 2021, vol. 20, 4 pages.

* cited by examiner

*Primary Examiner* — Vincent Q Nguyen

(57) ABSTRACT

A system for analyzing a sample includes a source configured to generate ions from constituent components of the sample; a mobility separator configured to separate ions received from the source based on the mobility in a gas; a ion storage array configured to store ions from the mobility separator as a plurality of mobility fractions; a mass filter configured to select ions within a mass-to-charge window; a mass analyzer configured to determine the mass-to-charge ratio of the ions; and a controller. The controller is configured to identify an ion mobility fraction and a mass-to-charge window to select for a charge state or ion class; utilize the mass filter to select ions from the ion storage array within the mass-to-charge window corresponding to a charge state or ion class; and analyze the selected ions with the mass analyzer.

17 Claims, 9 Drawing Sheets

ION MOBILITY ENHANCED QUALITATIVE AND QUANTITATIVE METHODS

FIELD

The present disclosure generally relates to the field of mass spectrometry including ion mobility enhanced qualitative and quantitative methods.

INTRODUCTION

While generally preferred for quantitation of multiple co-eluting analytes, filtering type mass spectrometry devices, such as quadrupole mass spectrometers, suffer from reduced efficiency (duty cycle) because they transmit ions of a single m/z ratio at a time while the rest are wasted. When performing an analysis of a complex sample, multiple analytes (N) can be targeted simultaneously by switching between ions and the duty cycle is limited to 1/N. While improvements can be made by only targeting transitions that correspond to ions eluting at a given moment, scheduling such experiments can be difficult when multiple ions elute at the same time or when retention times are unpredictable. Accumulating a broad range of ions in a trap and selectively ejecting them based on m/z to a quadrupole has the potential to avoid losing or missing ions while the quadrupole is analyzing only one m/z target at a time. However, the capacity of mass resolving ion traps is limited to between about $10^6$ ions per second, which is insufficient for the brightness of existing ion sources, which can generate about $10^{10}$ ions per second or more. As such, the potential gains would be negated by the inability to handle the entire load as compared to a normal flow-through regime with the quadrupole cycling between m/z ratios. Other approaches for ion accumulation can make use of ion mobility principles where ions are separated in time/space by differences in their collision cross sections. These techniques can suffer from similar space charge capacity limitations as the entire population of ions is expected to be confined to a small space before being injected into the mass spectrometer for subsequent analysis.

From the foregoing it will be appreciated that a need exists for improved systems and methods for quantitative analysis of a sample.

SUMMARY

In a first aspect, a system for analyzing a sample can include a source configured to generate ions from constituent components of the sample; a mobility separator configured to separate ions received from the source based on the mobility in a gas; a ion storage array configured to store ions from the mobility separator as a plurality of mobility fractions; a mass filter configured to select ions within a mass-to-charge window; a mass analyzer configured to determine the mass-to-charge ratio of the ions; and a controller. The controller can be configured to identify an ion mobility fraction and a mass-to-charge window to select for a charge state or ion class; utilize the mass filter to select ions from the ion storage array within the mass-to-charge window corresponding to a charge state or ion class; and analyze the selected ions with the mass analyzer.

In various embodiments of the first aspect, the mass filter can include a quadrupole mass filter.

In various embodiments of the first aspect, the mass analyzer can include a quadrupole mass analyzer, an electrostatic trap mass analyzer, a linear ion trap mass analyzer, or a time of flight mass analyzer.

In various embodiments of the first aspect, sizes of the ion mobility fractions can be uniform.

In various embodiments of the first aspect, multiple ion mobility fractions can be selected for a mass-to-charge window.

In various embodiments of the first aspect, sizes of the mass-to-charge windows can vary.

In various embodiments of the first aspect, sizes of the mass-to-charge windows can be uniform.

In a second aspect, a method for analyzing components of a sample can include ionizing the sample; separating the ions by ion mobility and store a plurality of ion mobility fractions in a storage array; isolating ions from a first ion mobility fraction of the plurality of ion mobility fractions using a mass filter to select a first isolation window corresponding to a charge state, an ion class, or combination thereof; directing the isolated ions to a mass analyzer; and determining the mass-to-charge ratio of the isolated ions using the mass analyzer.

In various embodiments of the second aspect, the mass filter can include a quadrupole mass filter.

In various embodiments of the second aspect, the mass analyzer can include a quadrupole mass analyzer, an electrostatic trap mass analyzer, a linear ion trap mass analyzer, or a time of flight mass analyzer.

In various embodiments of the second aspect, sizes of the ion mobility fractions can be uniform.

In various embodiments of the second aspect, sizes of the isolation windows can vary.

In a third aspect, a method for analyzing components of a sample can include ionizing the sample; separating the ions by ion mobility and store a plurality of ion mobility fractions in a storage array; isolating precursor ions within a first transmission window using a mass filter, the ions from one or more ion mobility fractions are selected to correspond to a charge state, an ion class, or combination thereof for the first transmission window; fragmenting the isolated precursor ions to produce fragment ions; directing the fragment ions to a mass analyzer to determine the mass-to-charge ratios of the fragment ions; and identify the precursor ion based on mass-to-charge ratios the fragment ions.

In various embodiments of the third aspect, the mass filter can include a quadrupole mass filter.

In various embodiments of the third aspect, the mass analyzer can include a quadrupole mass analyzer, an electrostatic trap mass analyzer, a linear ion trap mass analyzer, or a time of flight mass analyzer.

In various embodiments of the third aspect, sizes of the transmission windows can be uniform.

In various embodiments of the third aspect, sizes of the transmission windows can vary.

In a fourth aspect, a method for analyzing components of a sample can include ionizing the sample; separate the ions by ion mobility and store a plurality of ion mobility fractions in a storage array; for at least two ion mobility fractions of the plurality of ion mobility fractions: selecting, using a mass filter, precursor ions from each of at least two ion mobility fractions, wherein each precursor ion is selected using a transmission window corresponding to a charge state, an ion class, or combination thereof of the corresponding ion mobility fraction; and fragment the selected target ion to produce fragment ions; delivering the fragment ions from the at least two ion mobility fractions to a mass analyzer; and analyzing the mass-to-charge ratio of the fragment ions from the at least two ion mobility fractions concurrently using the mass analyzer.

In various embodiments of the fourth aspect, at least three ion mobility fractions of the plurality of ion mobility fractions can include precursor ions and at least one of the at least three ion mobility fractions can be excluded from the at least two ion mobility fractions, and wherein the steps of selecting, fragmenting, delivering, and analyzing can be repeated with a different at least one of the at least three ion mobility fractions excluded.

In various embodiments of the fourth aspect, the mass filter can include a quadrupole mass filter.

In various embodiments of the fourth aspect, the mass analyzer can include an electrostatic trap mass analyzer, a linear ion trap mass analyzer, or a time of flight mass analyzer.

DRAWINGS

For a more complete understanding of the principles disclosed herein, and the advantages thereof, reference is now made to the following descriptions taken in conjunction with the accompanying drawings, in which.

Figure 1:
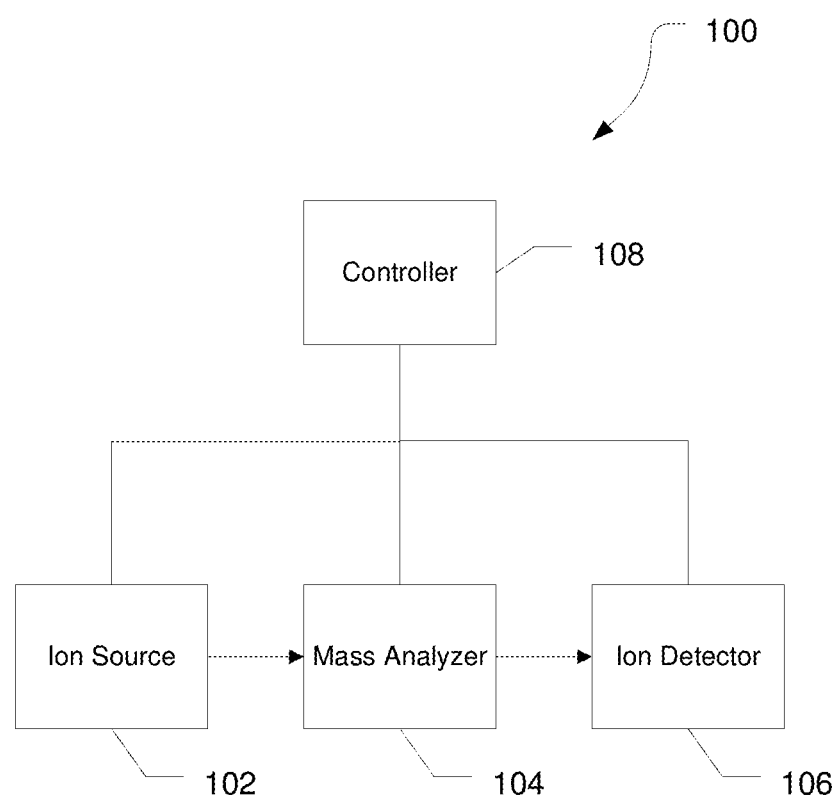
FIG. 1 is a block diagram of an exemplary mass spectrometry system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of ion mobility enhanced qualitative and quantitative methods are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including, but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate ions based on a mass-to-charge ratio of the ions. For example, the mass analyzer 104 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detected negative ions.

Low Pressure Ion Mobility Separation

Figure 2:
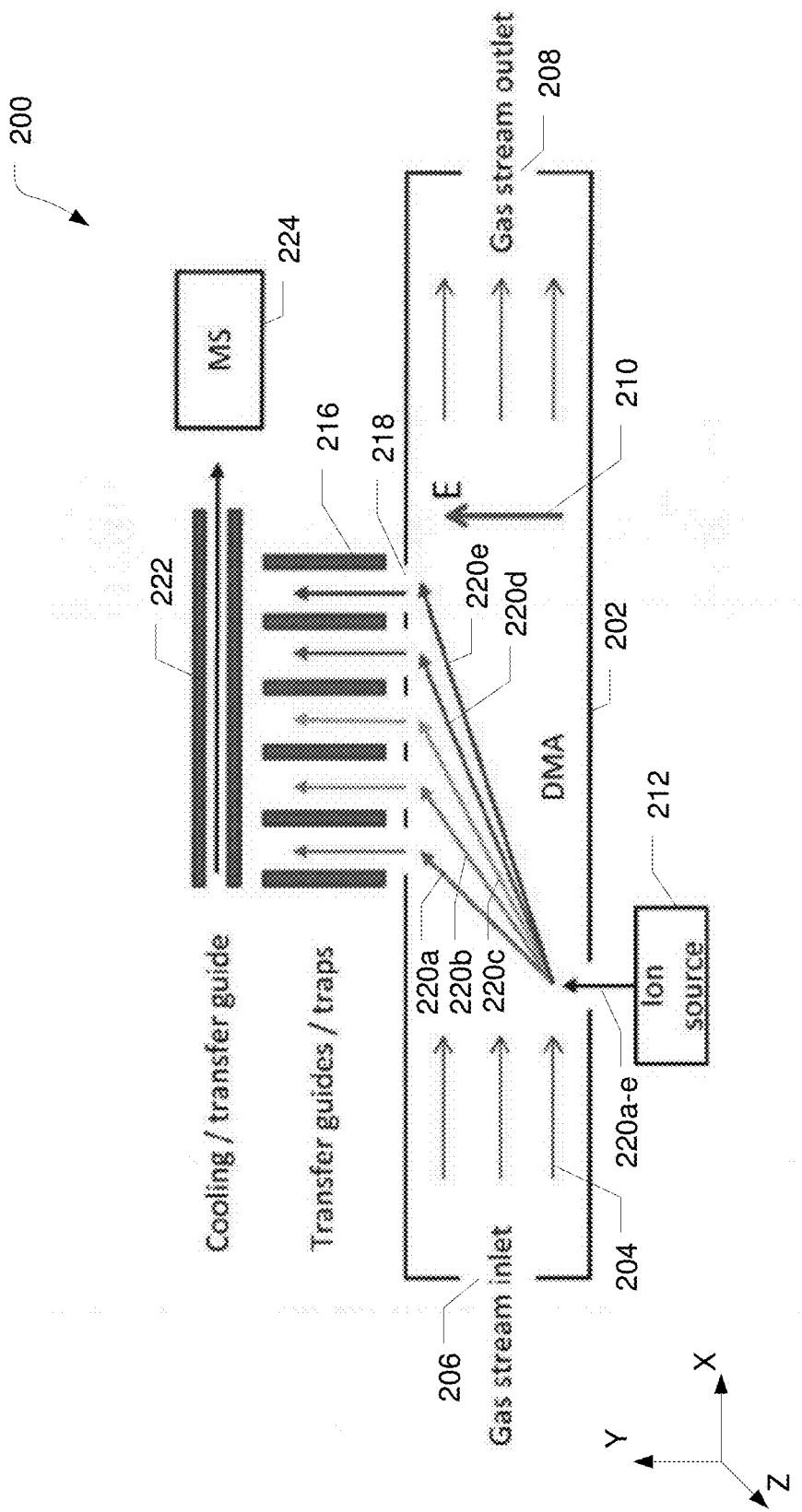
FIG. 2 is a block diagram illustrating an exemplary ion mobility separator, in accordance with various embodiments.

FIG. 2 is a block diagram illustrating an ion mobility separator 200. The mobility separator 200 can include a mobility cell 202 consisting of a region, such as a substantially rectangular region, with a gas flow 204 moving in a first direction from a gas inlet 206 at one end to a gas outlet 208 at the opposite end. Additionally, an electrical field gradient 210 can be applied in a second direction. In various embodiments, the first direction and the second direction can form an angle of between about 25° and 180°, such as between about 70° and about 150°. In particular embodiments, the first direction and the second direction can be orthogonal (at right angles, perpendicular) to one another.

In various embodiments, a gas pressure within the mobility cell 202 can be between about 1 Torr and about 20 Torr, such as between about 2 Torr and about 6 Torr. In various embodiments, the gas flow can be between about 5 slm and about 50 slm. In various embodiments, the average gas velocity within the mobility analyzer cell 202 can be between about 50 m/s and about 250 m/s, such as between about 100 m/s and about 200 m/s.

An ion source 212 can be located proximal to an ion entrance 214 and an array of ion channels 216 can be located proximal to an array of ion exit orifices 218. The ion exit orifices 218 can be located opposite the ion entrance 214 in the second direction, and can be offset from the ion entrance 214 and spaced apart from one another in the first direction. Ions 220a through 220e entering the mobility cell 202 from the ion source 212 can be separated into the ion exit orifices 218 and directed into the array of ion channels 216 in accordance with their ion mobility within the mobility cell 202. In various embodiments, the ions 220a through 220e can flow at a substantially the same velocity along the first direction and may move in the second direction according to their collisional cross section. Thus, ions 220e with a larger collisional cross section can move more slowly in the second direction due to a larger number of collisions with the molecules in the gas flow relative to ions with a smaller collisional cross section 220a. Due to the slower movement in the second direction, ions 220e can move further along the first direction during their transit across the mobility cell 202. In this way, ions with successively larger collisional cross section can be sorted into the array of ion channels 216, such that ions in an ion channel have a different range of ion mobilities from ions in an adjacent ion channel.

In various embodiments, a lens array (not shown) can be positioned between the ion exit orifices 218 and the ion channels 216. The lens array can be configured to guide ions into the respective channel, such as by focusing the ions towards the centerline of the channel.

In various embodiments, the plurality of ion channels 216 can include between about 2 ion channels and about 50 ion channels, such as between about 5 ion channels and about 20 ion channels, even between about 7 ion channels and about 15 ions traps.

A cooling/transfer guide 222 can be located adjacent to the plurality of ion channels 216. Ions can be ejected from one of the ion channels 216 into the cooling/transfer guide 222. From the cooling/transfer guide 222, the ions can be directed to a mass analyzer 224. In various embodiments, the ions may be directed to other processes, such as a fragmentation cell (not shown), prior to the mass analyzer.

In various embodiments, the mobility separator system 200 can separate ions spatially to allow only one or a few types of ions to be directed to the mass analyzer at a time while capturing multiple groups of ions that can be stored in the ion channels 216 and subsequently injected into the mass analyzer. The ejections from the ion channels 216 can allow the mass analyzer to perform mass analysis of an ion packet while other ions continue to be accumulated and stored in the ion channels 216. The potential gain provided by the mobility separator can be equal to the number of separate channels.

Figure 3:
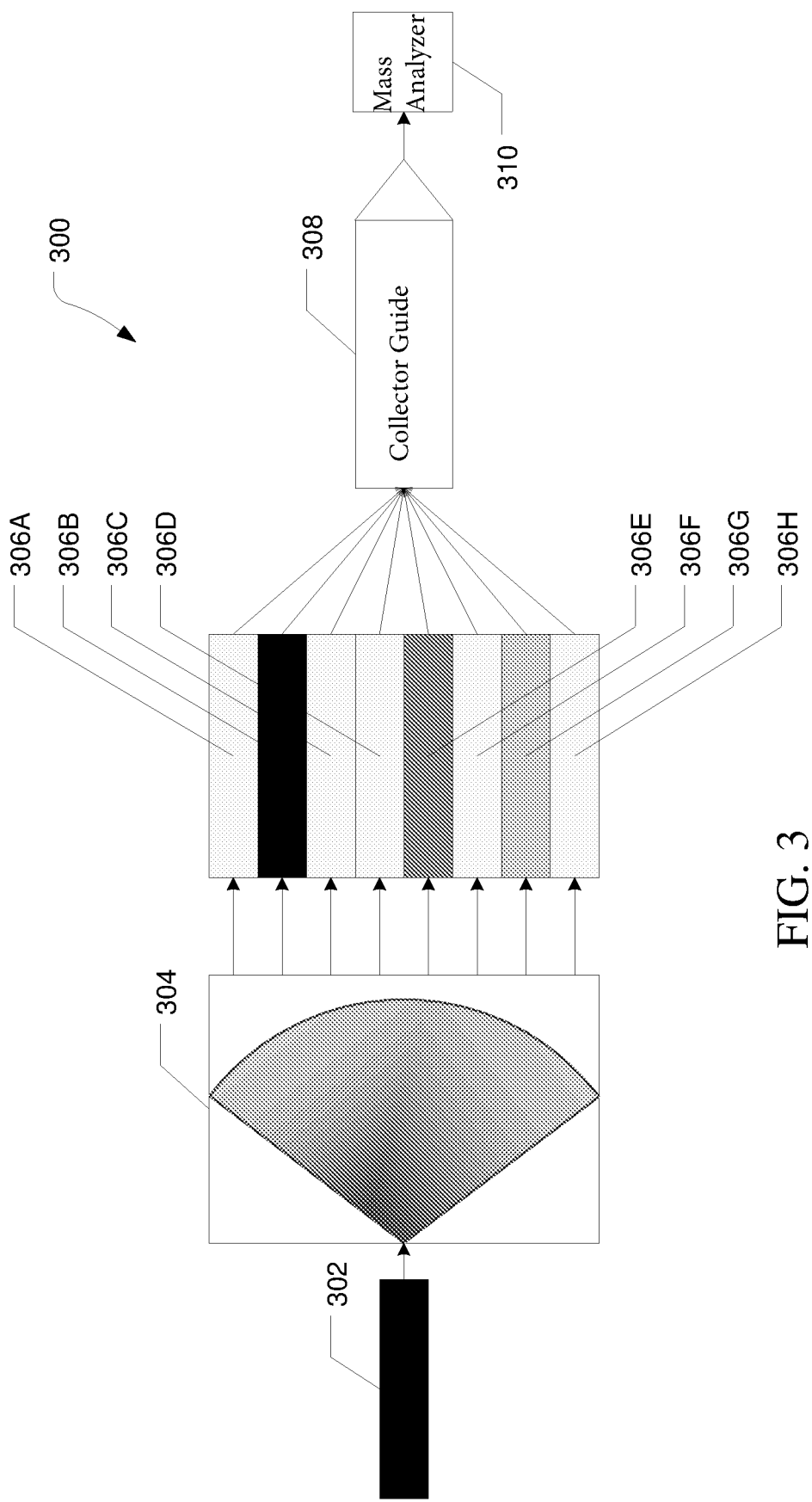
FIG. 3 is a block diagram of an exemplary mass spectrometry system, in accordance with various embodiments.

FIG. 3 illustrates a mass spectrometry system 300 for quantifying components of a sample. Mass spectrometry system 300 can include an ion inlet 302, an ion mobility separator 304, transfer guides/traps 306A through 306H, a collector guide 308, and a mass analyzer 310.

The ion inlet 302 can receive ions, such as from an ion source, for example ion source 32 of FIG. 1 or ion source 312 of FIG. 3. Collector guide 308 can be similar to cooling/transfer guide 322 of FIG. 3. Collector guide 308 can be located adjacent to the transfer guides/traps 306A through 306H. Ions can be ejected from one of the transfer guides/traps 306A through 306H into the collector guide 308. From the Collector guide 308, the ions can be directed to a mass analyzer 310. In various embodiments, the ions may be directed to other processes, such as a fragmentation cell (not shown), prior to the mass analyzer 310.

In various embodiments, the ion mobility separator 304 can separate ions based on their ion mobility as previously described. By altering the gas flow or the electric field, a set of target ions can be guided into the transfer guide/traps, such as transfer guides/traps 306B, 306E, and 306G. Due to the separation of ion mobility separator 304, each transfer guide/trap would accumulate different target ions from the other transfer guide/traps. Additionally, the transfer guides/traps can be individually accessible, such that, for example, ions from transfer guide/trap 1006B could be ejected into 308 for analysis while transfer guide/trap 306E is accumulating ions and transfer guide/trap 306G is holding ions to be analyzed after the ions within transfer guide/trap 1006B.

During a sample analysis, it can be necessary to monitor multiple parent ions at a time. Typically, compounds can be separated using chromatography, such as ion chromatography or gas chromatography, or other separation technique. However, during a complex separation, the elution of two or more compounds can overlap. Each compound can give rise to one or more ions, and during an elution window, multiple target ions may be monitored simultaneously to detect, identify, and quantify one or more compounds of interest.

In various embodiments, the list of co-eluting compounds can analyzed and subdivided into multiple groups based on similarity of their mobility so that ions from one group are collected in the same transfer guide/trap. During a first acquisition cycle, ions from each group can be transferred to the collector guide 308. One ion species can be selected, such as by using a quadrupole mass filter. The ion species can be the fragmented and detected. In subsequent acquisition cycles additional ions from each group can be targeted.

The effectiveness of both qualitative and quantitative analysis by mass spectrometry depends on the ability of the instrument to handle the dynamic range and noise that are very typical for complex samples.

For example, results of shotgun proteomics rely on selecting right precursors during the MS run. Interference from singly charged peptide species and other contaminants can lead to wasted time during analysis and identification errors at the MS/MS stage. High density ion flux can lead to quick filling of analytical traps which forces reduced accumulation times and lower sensitivity to low level components.

Mobility pre-separation of incoming ions can help filter out interferences and pre-select the desired class of ions for fragmentation while reducing potential space charge issues.

Figure 4A:
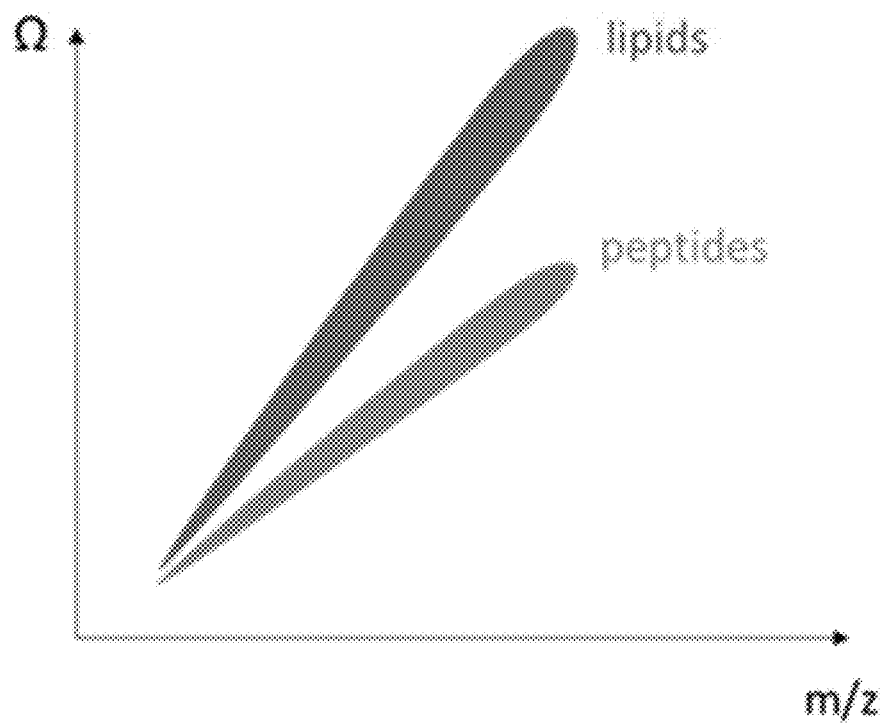
FIGS. 4A and 4B are diagrams illustrating ion mobility/mass-to-charge space.
Figure 4B:
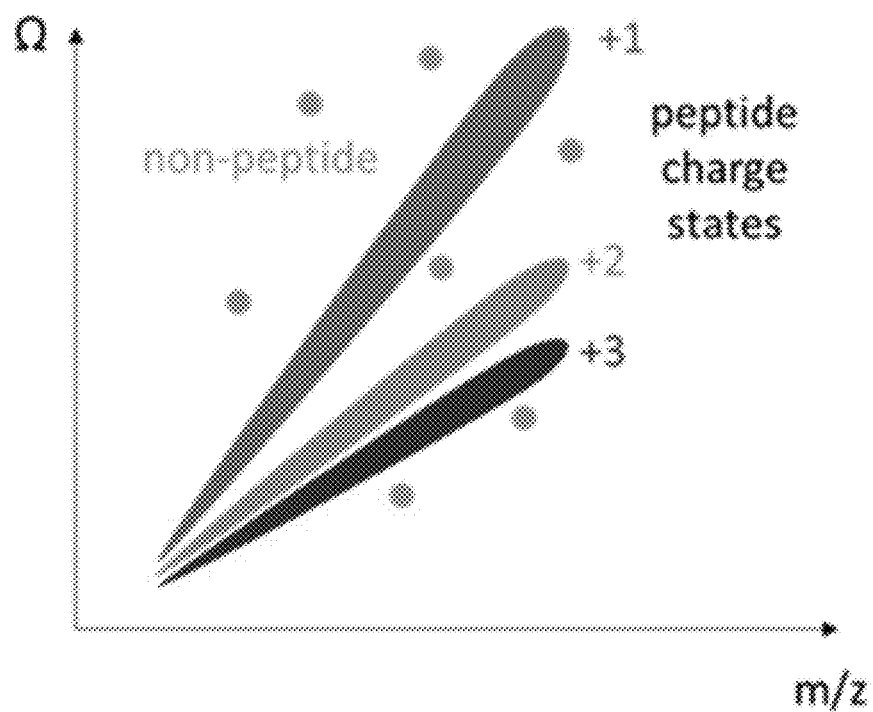

Using a drift-type ion mobility (IMS) or trapped ion mobility (TIMS) system, known correlations between ion collision cross-section, m/z and charge can be used to select for desired classes of ions and desired charge states. FIG. 4A shows that different classes of ions (lipids and peptides) occupy different regions of ion mobility/mass-to-charge space. FIG. 4B shows that peptides with different charge states are similarly separated in different regions of ion mobility/mass-to-charge space.

In various embodiments, limiting the mass-to-charge transmission window for a specific mobility range of precursors makes it possible to filter out unwanted components that do not follow the corresponding trend lines, thereby reducing overall charge load to the trap analyzers downstream.

In various embodiments, multiple separated fractions are stored simultaneously and can be randomly accessed for MS analysis. The correlation between mass and mobility of ions allows the first MS analyzer (typically a quadrupole mass filter) to perform smart manipulation of ion fractions to reduce charge load on the system and improve overall sensitivity.

One of possible separation devices to use is the Differential Mobility Analyzer (DMA) which allows to pre-separate multiple parents while they are traveling through the gas. This approach significantly reduces the effect of space charge as ions of different mobility are quickly separated in space and trapping is performed at a later point when ion densities are already reduced and further separation is not needed.

Other mobility separation devices known in the art such as those based on the conventional IMS or TIMS can be used in this manner as well.

The further operation can be explained based on the example of a typical shotgun proteomics workflow that consists of two main steps. In the first one (MS step) the precursor ions of interest are identified, and a certain number of precursors are selected for the second (MS/MS) step. Then those are fragmented one by one by scanning the quadrupole isolation window. This cycle is repeated over the entire duration of the chromatogram.

In both steps, there are losses due to either finite analyzer trap capacity or dynamic range of the detection system limiting the duty cycle. Also, typically only one species of ions is analyzed at a time while the rest of the population is discarded. The use of mobility pre-separation allows to minimize these losses as detailed below.

Figure 5:
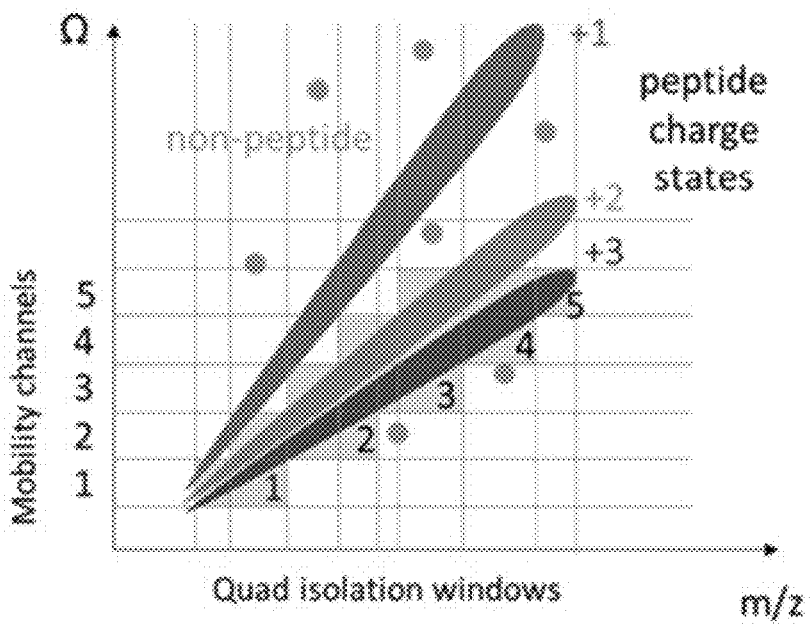
FIG. 5 is a diagram illustrating selection of ions based on ion mobility/mass-to-charge space.

For the MS step, instead of simple accumulating and analysis steps limited by the mass spectrometer trap capacity, the accumulation first happens in the ion mobility channels. Subsequently, the population of the specific channels is transferred into the mass spectrometer for analysis. Due to the pre-separation, the total charge counts are already reduced so the downstream ion trap capacity is less limiting. In addition, the number of unnecessary ions can be reduced by synchronizing the timing of channel transfer with the broad window quadrupole isolation as shown in FIG. 5.

As ions from mobility channels 1-5 enter the mass spectrometer, the quadrupole mass window is set to transmit only the desired species (with charge of +2 and +3) as indicated by the grey rectangles. The rest of the ions are discarded which should reduce noise and increase the confidence of precursor selection. That is, selected precursors have a higher chance of yielding useful data when non-peptides and peptides with +1 charge state are excluded.

Figure 6:
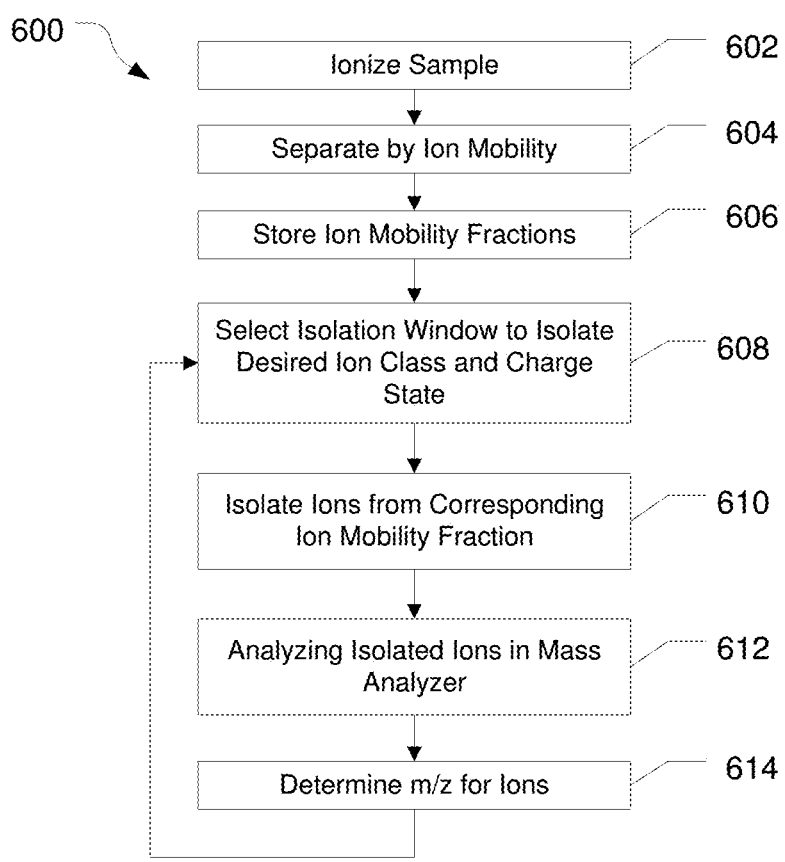
FIG. 6 is a method for selection ions based on ion mobility/mass-to-charge space, in accordance with various embodiments.

FIG. 6 illustrates a method 600 of analyzing ions. At 602, a sample can be ionized, and, at 604, the ions can be separated by ion mobility, such as by ion mobility separator 304 of FIG. 3. At 606, the ion mobility fractions can be stored, such as in a storage array, such as transfer guides/traps 306A through 306H of FIG. 3. In various embodiments, the ion mobility fractions can be At 608, an isolation window can be selected for an ion mobility fraction to define an ion mobility/mass-to-charge region corresponding to a desired ion class and/or charge state. As illustrated in FIG. 5, the isolation windows can be of different widths depending on the mass-to-charge range of the ion mobility/mass-to-charge region targeted. At 610, the mass filter can be used to isolate ions within the isolation window from ions with mass-to-charge values outside of the isolation window and thus the ion mobility/mass-to-charge region. This can exclude ions that are not of the ion class or charge state being selected.

At 612, the isolated ions from the mass filter can be sent to a mass analyzer, and, at 614, the m/z can be determined for the isolated ions. Then the method can return to 608 and the ion selection can be performed for a different ion mobility fraction.

Figure 7:
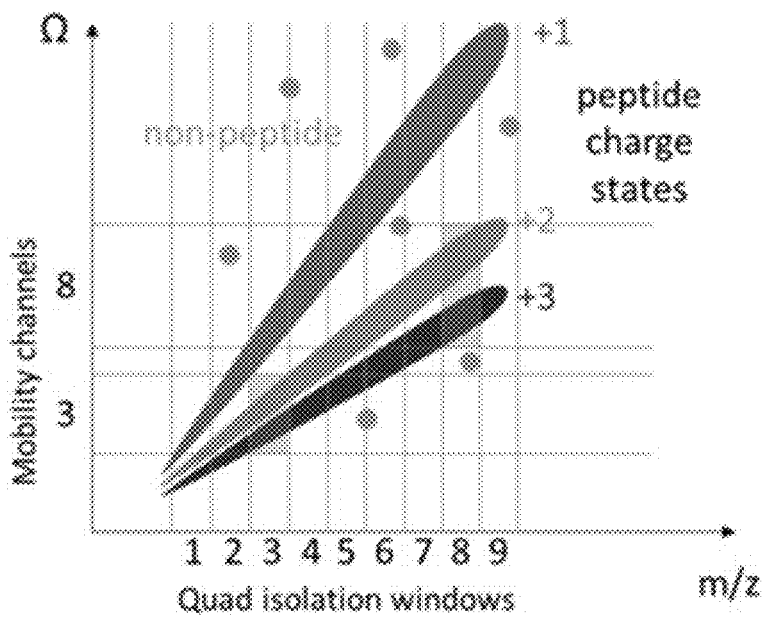
FIG. 7 is a diagram illustrating selection of ions based on ion mobility/mass-to-charge space, in accordance with various embodiments.

FIG. 7 illustrates ion selection, such as for MS/MS mode. The transmission window of the quadrupole in a hybrid mass spectrometer can be stepped (1 through 9) to fragment all the available precursors in the corresponding window. In various embodiments, the width of the window can be a few Daltons.

If only certain ion mobility fractions are provided to the mass filter (see the corresponding collision cross section intervals for windows 3 and 8 on the vertical axis), then only the desired charge state ion will be detected and unwanted ions can be discarded, thereby reducing noise and interference in the spectra.

While the ions from mobility channels corresponding to the currently analyzed ion are being sent to the mass spectrometer, the rest of the channels keep accumulating ions with different mobility (and m/z) values. As the quadrupole mass filter goes through the pre-determined number of windows, those additional ions are fragmented and analyzed as well as opposed to being lost in a regular MS/MS workflow.

Moreover, it can be possible to increase the quadrupole isolation width so that more than one precursor can be identified at a time (as used in data-independent analysis approaches) with less chance of result uncertainty.

In an exemplary embodiment of a DIA workflow, an independent acquisition of MS2 over the entire precursor mass range using wide isolation windows (10-100 amu) is performed. The generated MS2 spectra can searched by spectral libraries. The ability to only deliver ions from a narrow range of mobilities should increase the confidence of ion confirmation.

Figure 8:
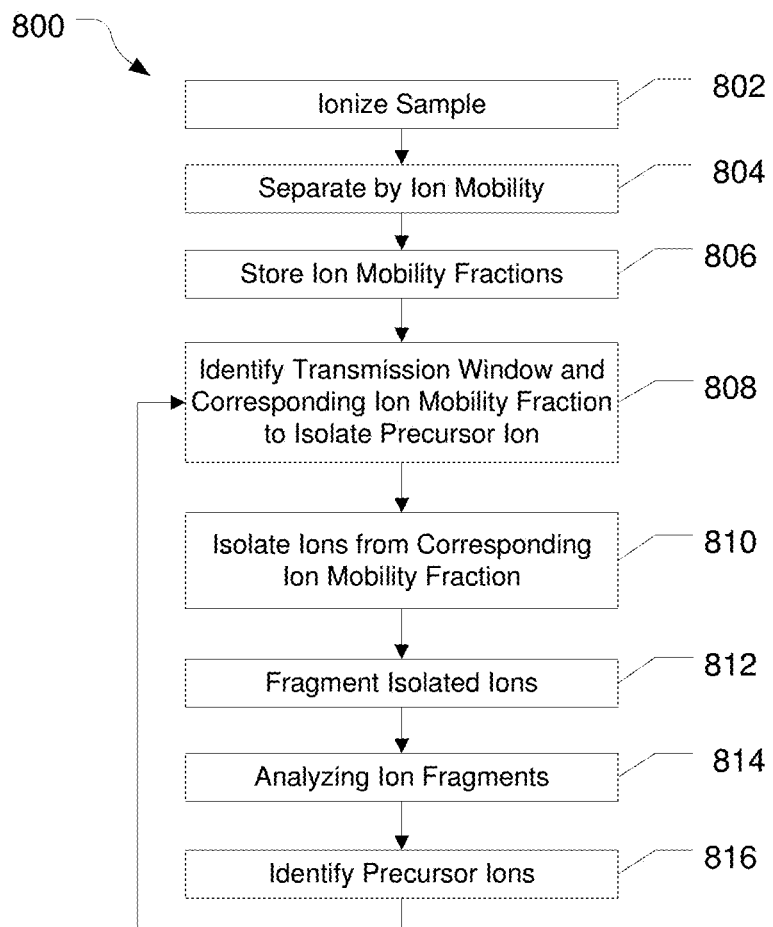
FIG. 8 is a method for selection ions based on ion mobility/mass-to-charge space, in accordance with various embodiments.

FIG. 8 illustrates a method 800 of analyzing ions. At 802, a sample can be ionized, and, at 804, the ions can be separated by ion mobility, such as by ion mobility separator 304 of FIG. 3. At 806, the ion mobility fractions can be stored, such as in a storage array, such as transfer guides/traps 306A through 306H of FIG. 3.

At 808, a transmission window can be selected for a precursor ion and an ion mobility fraction for the desired ion class and/or charge state corresponding to the transmission window can be selected. In various embodiments, the transmission window can be determined in a data dependent fashion, that is the m/z of the precursor ion can be selected based on a survey scan, such as a survey scan obtained by using method 600. In other embodiments, the system can be operated in a data independent mode where the system steps through consecutive transmission window of a broader mass range and the ion mobility fractions corresponding to each transmission window can be selected. As illustrated in FIG. 7, the ion mobility fractions can be of different widths depending on the mass-to-charge range of the ion mobility/mass-to-charge region targeted. Alternatively, adjacent ion mobility fractions may be combined for a transmission window. At 810, the mass filter can be used to discard ions with mass-to-charge values outside of the transmission window while selecting the precursor ions with mass-to-charge values within the transmission window. By limiting to the ion mobility fractions corresponding to the transmission window, ions that are not the desired ion class or charge state can be excluded.

At 812, the isolated ions can be fragmented. At 814, the ion fragments can be sent to a mass analyzer, and, at 816, the precursor ions can be identified based on the fragment ions. Then the method can return to 808 and the ion selection can be performed for a different transmission window.

In another embodiment, the synchronized ejection of ions from channels with isolation in the quadrupole mass filter can be used to speed up acquisition and reduce number of charges in individual channels. This approach would be particularly beneficial when used with mass analyzers featuring long acquisition time, such as electrostatic trap mass analyzer, a linear ion trap mass analyzer, or a time-of-flight mass analyzer.

Figure 9:
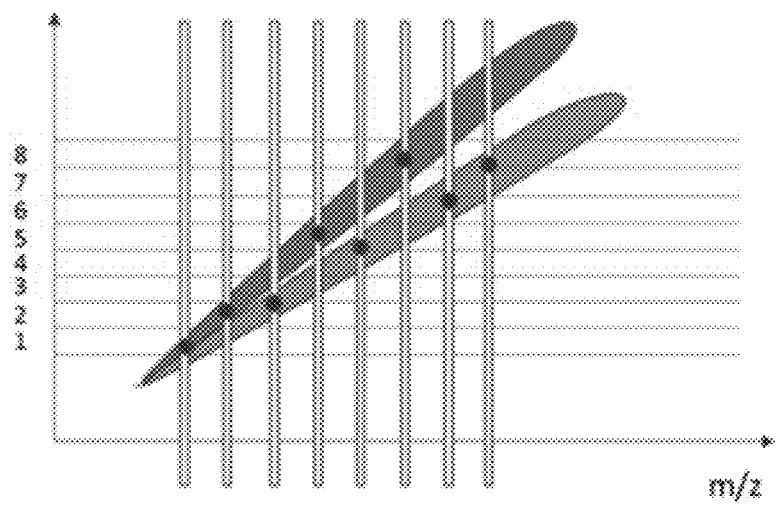
FIG. 9 is a diagram illustrating selection of ions based on ion mobility/mass-to-charge space, in accordance with various embodiments.

FIG. 9 illustrates this concept for 8 channels and the corresponding isolation windows. The FIG. 10 shows possible workflow for targeted MS/MS analysis.

Figure 10:
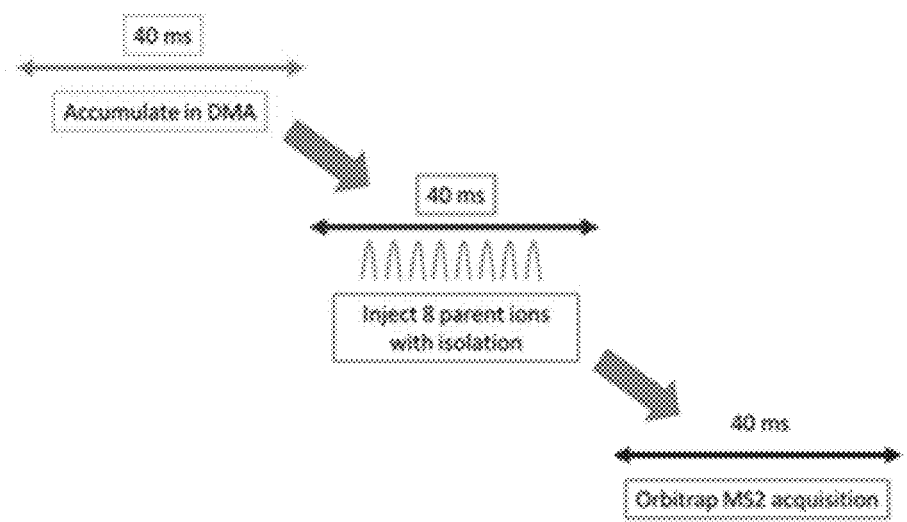
FIG. 10 is a method for selection ions based on ion mobility/mass-to-charge space, in accordance with various embodiments.

First, ion mobility fractions can be accumulated in mobility channels for a certain period of time (40 ms in the example of FIG. 10). It is important that the accumulation time is short enough so no overfilling of channels occurs. Then the content of channels is ejected into the mass spectrometer where fragmentation of selected precursor ions is performed. The ejection from channels 1-8 is performed sequentially so no mixing between ion packets is allowed. This also permits quadrupole isolation of target precursors for each channel. All isolated precursors, after fragmentation in a collision cell, are delivered to a mass analyser for spectrum generation. Then the acquisition length is tuned to be similar to the accumulation period in DMA channels. This would assure that once the acquisition is complete, a new cycle can be started immediately.

As a result, the full accumulation/acquisition cycle is only 40 ms. In a regular workflow, when all channels are analyzed sequentially, the full cycle would be 40×8=320 ms. Such long accumulation has a potential to overfill traps and also means slower analysis.

Figure 11:
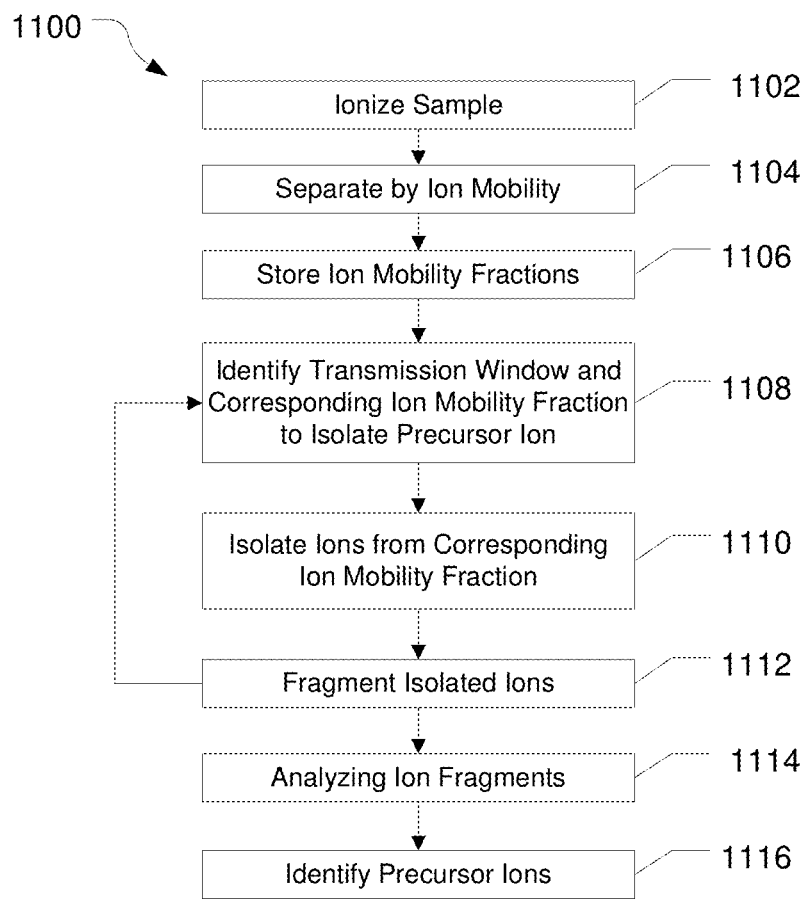
FIG. 11 is a diagram illustrating a workflow for selection ions based on ion mobility/mass-to-charge space, in accordance with various embodiments.

FIG. 11 illustrates a method 1100 of analyzing ions. At 1102, a sample can be ionized, and, at 1104, the ions can be separated by ion mobility, such as by ion mobility separator 304 of FIG. 3. At 1106, the ion mobility fractions can be stored, such as in a storage array, such as transfer guides/traps 306A through 306H of FIG. 3.

At 1108, a transmission window can be selected for a precursor ion and an ion mobility fraction for the desired ion class and/or charge state corresponding to the transmission window can be selected. At 1110, the mass filter can be used to discard ions with mass-to-charge values outside of the transmission window while selecting the precursor ions with mass-to-charge values within the transmission window. By limiting to the ion mobility fractions corresponding to the transmission window, ions that are not the desired ion class or charge state can be excluded.

At 1112, the isolated ions can be fragmented and stored, such as in an ion trap. Then the method can return to 1108 and the ion selection can be performed for a different precursor ion. Once the desired precursors are fragmented and stored in the ion trap, the ion fragments can be sent to a mass analyzer at 1114, and the precursor ions can be identified based on the fragment ion masses at 1116.

One complication from the proposed approach comes from the fact that all precursors and all fragments are analyzed in the ion trap at once. So there is a need to determine which parents come from which precursors with high degree of confidence. To simplify this task, the selection of channels for the mass analysis is modified from one cycle to the next.

Figure 12:
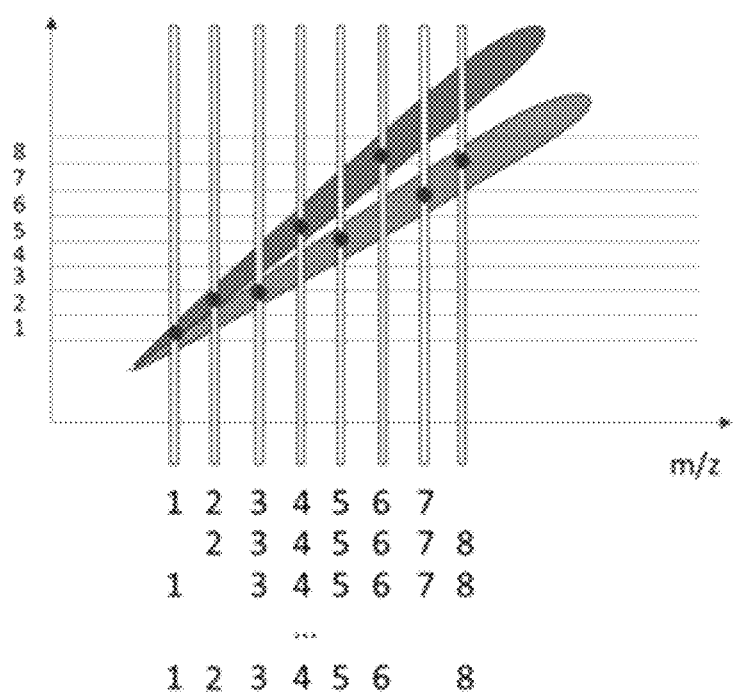
FIG. 12 is a diagram illustrating an exemplary encoding scheme used when selection ions based on ion mobility/mass-to-charge space, in accordance with various embodiments.

As is shown in FIG. 12, the selection of channels for each cycle is can be encoded using such that ions from a small number of channels (possibly, only one) are not analyzed. As illustrated in FIG. 12, the number of skipped channels can be advanced by 1 each cycle. One of skill in the art would recognize that other more sophisticated encoding schemes can be used. However, it can be desirable to keep the number of skipped channels low to maximize the duty cycle of the analysis.

When analyzing data from consecutive cycles, each spectra will have fragments from all precursors except the skipped precursors. The spectra can be deconvolved to assign ion fragments to the correct precursors while the precursors can be quantified using the spectra in which the fragments from the precusor are present.

Other encoding and deconvolution approaches known in the art (such as Hadamard transformation, etc.) can be used to improve ion fragment identification fidelity.

The success of this approach depends on relative stability of the ion signal through the duration of a cycle sequence, for example, 8 cycles×40 ms=320 ms. This is a reasonable expectation given the typical ion chromatography peaks can reach 10-20 seconds for long gradients typical for shotgun proteomics and some other applications.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for analyzing a sample comprising:
   a source configured to generate ions from constituent components of the sample;
   a mobility separator configured to separate ions received from the source based on the mobility in a gas;
   a ion storage array configured to store ions from the mobility separator as a plurality of mobility fractions;
   a mass filter configured to select ions within a mass-to-charge window from at least one of the plurality of mobility fractions from the ion storage array;
   a mass analyzer configured to determine the mass-to-charge ratio of the ions selected by the mass filter; and
   a controller configured to:
   identify a combination of an ion mobility fraction and a mass-to-charge window to select for a charge state or ion class;
   utilize the mass filter to select ions within the mass-to-charge window from the ion storage array corresponding to the ion mobility fraction corresponding to a charge state or ion class while excluding ions of a different charge state or ion class; and
   analyze the selected ions with the mass analyzer.

2. The system of claim 1, wherein the mass filter includes a quadrupole mass filter.

3. The system of claim 1, wherein the mass analyzer includes a quadrupole mass analyzer, an electrostatic trap mass analyzer, a linear ion trap mass analyzer, or a time of flight mass analyzer.

4. The system of claim 1, wherein sizes of the ion mobility fractions are uniform.

5. The system of claim 1, wherein multiple ion mobility fractions are selected for the mass-to-charge window.

6. The system of claim 1, wherein sizes of the mass-to-charge windows vary.

7. The system of claim 1, wherein sizes of the mass-to-charge windows are uniform.

8. A method for analyzing components of a sample comprising:
   ionize the sample;
   separating the ions by ion mobility and store a plurality of ion mobility fractions in a storage array;
   isolating ions from a first ion mobility fraction of the plurality of ion mobility fractions using a mass filter to select a first isolation window corresponding to a charge state, an ion class, or combination thereof while excluding ions of a different charge state or ion class;
   directing the isolated ions to a mass analyzer; and
   determining the mass-to-charge ratio of the isolated ions using the mass analyzer.

9. The method of claim 8, wherein the mass filter includes a quadrupole mass filter.

10. The method of claim 8, wherein the mass analyzer includes a quadrupole mass analyzer, an electrostatic trap mass analyzer, a linear ion trap mass analyzer, or a time of flight mass analyzer.

11. The method of claim 8, wherein sizes of the ion mobility fractions are uniform.

12. The method of claim 8, wherein sizes of the isolation windows vary.

13. A method for analyzing components of a sample comprising:
   ionizing the sample;
   separating the ions by ion mobility and store a plurality of ion mobility fractions in a storage array;
   isolating precursor ions within a first transmission window using a mass filter, the ions from one or more ion mobility fractions are selected to correspond to a charge state, an ion class, or combination thereof for the first transmission window while excluding ions of a different charge state or ion class;
   fragmenting the isolated precursor ions to produce fragment ions;
   directing the fragment ions to a mass analyzer to determine the mass-to-charge ratios of the fragment ions; and
   identifying the precursor ion based on mass-to-charge ratios the fragment ions.

14. The method of claim 13, wherein the mass filter includes a quadrupole mass filter.

15. The method of claim 13, wherein the mass analyzer includes a quadrupole mass analyzer, an electrostatic trap mass analyzer, a linear ion trap mass analyzer, or a time of flight mass analyzer.

16. The method of claim 13, wherein sizes of the transmission windows are uniform.

17. The method of claim 13, wherein sizes of the transmission windows vary.

* * * * *